United States Patent Office 3,407,071
Patented Oct. 22, 1968

3,407,071
LIQUID SHORTENING COMPOSITION
George N. Bookwalter and Frank H. Brock, Decatur, Ill., assignors to A. E. Staley Manufacturing Company, Decatur, Ill., a corporation of Delaware
No Drawing. Filed July 20, 1964, Ser. No. 383,912
7 Claims. (Cl. 99—94)

ABSTRACT OF THE DISCLOSURE

An edible liquid food shortening which can be used in formulating cake mixes and which contains an edible liquid vegetable oil and less than 14% of an emulsifier system. The emulsifier system contains a glyceride ester, a solid fatty acid partial ester of a hexitan and a solid fatty acid ester of a hexitan polyoxyethylene ether and, in addition, may contain a free saturated fatty acid and glycerol monooleate.

---

This invention relates to edible, liquid shortening compositions useful in the preparation of baked goods. More particular, this invention relates to normally liquid edible shortening compositions which are highly effective in the preparation of cakes.

The advantages of liquid shortening compositions comprising liquid vegetable oils over semisolid or "plastic" shortening compositions in the production of baked goods are many and well known. In both industrial and household applications plastic shortenings are difficult to handle and to apportion accurately. Plastic shortenings must be liquefied by heating to permit their use in large scale automatic bakery equipment. However, when plastic shortenings are liquefied and then used in that state in the preparation of baked goods their effectiveness as shortening agents in the preparation of baked goods of good volume, texture and general eating quality is markedly decreased. The advantages of shortening compositions which are liquid at ambient temperatures are therefore readily apparent.

Despite the many advantages of normally liquid, edible shortenings, comprising liquid vegetable oils, they have not found full acceptance in the baking industry. Principally this is due to the failure to consistently obtain high quality baked products, especially cakes, when liquid shortenings are used. In order to improve their shortening properties, it has been suggested that emulsifiers be incorporated in the liquid vegetable oil. This incorporation has resulted in definite improvements in the shortening properties of liquid oils. However, even with these improvements it is still generally recognized in the baking industry that cakes prepared with liquid vegetable oils containing previously proposed emulsifiers and combinations of emulsifiers, especially cakes that have a high ratio of sugar to flour, generally remain inferior to cakes prepared with plastic shortenings.

It is, therefore, the general object of this invention to provide a normally liquid, edible shortening which can be used to produce high quality cakes as judged by cake volume, cake texture, cake grain and cake tenderness.

It is an additional object of this invention to provide a combination of emulsifiers, hereinafter referred to as an emulsifier system, which imparts superior shortening properties to liquid vegetable oils.

It is a further object of this invention to provide a liquid shortening composition having improved shortening characteristics which can be conveniently handled and used in conjunction with large scale automatic baking equipment.

Still further objects and advantages of this invention will be apparent from the description which follows.

The improved liquid shortening composition of our invention comprises normally liquid, edible vegetable oil in which is incorporated a specific emulsifier system. The emulsifier system incorporated in the vegetable oil comprises from about 2.0 to about 7.0% by weight of a glyceride ester reaction product obtained by reacting under esterification conditions a mixture of glycerine, lactic acid and at least one saturated fatty acid containing from 12 to 22 carbon atoms, the ratios of lactic acid to glycerine and of fatty acid to glycerine both being in the range 0.8:1 to 1.5:1 in the said mixture; from about 2.0 to about 8.0% by weight of at least one solid fatty acid partial ester of a hexitan; from about 0.2 to about 2.0% by weight of at least one solid fatty acid ester of a hexitan polyoxyethylene ether having 2 to 20 oxyethylene groups per mol; from 0 to about 1.5% by weight of at least one free saturated fatty acid containing from 12 to 22 carbon atoms and 0 to about 2% by weight of glycerol monooleate, the said weights being based on the weight of the total shortening composition, that is to say, the sum of the vegetable oil and the emulsifier system.

The normally liquid, edible vegetable oil used in our liquid shortening may be any vegetable oil having shortening properties and having an iodine value in excess of about 85. The iodine value indicates the liquidity of the oil. Such oils include soybean oil, corn oil, sesame seed oil, cottonseed oil, peanut oil, safflower oil and mixtures of the aforestated oils. Principally because of its abundance and low cost, soybean oil is preferred for use in our shortening composition.

The glyceride ester reaction product used in our invention is conveniently produced by reacting a mixture of lactic acid, glycerine and saturated fatty acid containing from 12 to 22 carbon atoms at temperatures in the range of from about 200° to about 400° F. using mol ratios of lactic acid to glycerine and of saturated fatty acid to glycerine in the range of from 0.8:1 to 1.5:1. After production of the glyceride ester reaction product the water of reaction is conveniently removed by distillation in the conventional manner. In preparing the reaction product we prefer to use palmitic acid, stearic acid or mixtures of these acids as the fatty acid. We prefer these fatty acids principally because of their ready availability. The glyceride ester reaction product will be a mixture of glycerides and will typically contain mono-, and di- and tri-glycerides of several combinations of lactic acid and fatty acid acyl residues at the various hydroxyl positions of the glycerine. We have found that the glyceride ester reaction product gives optimum effect when it is included in our shortening composition in amounts ranging from about 3.0 to about 6.0% by weight.

Typical partial esters of hexitans which find use in our shortening composition include sorbitan monostearate, sorbitan monomyristate, sorbitan tristearate, sorbitan monopalmitate, sorbitan distearate, mannitan dimyristate, mannitan monopalmitate and mixture of the aforestated materials. Principally because of its ready availability we prefer to use sorbitan monostearate. We have found that the hexitan partial esters are most advantageously used in our shortening compounds in amounts ranging from about 3.5 to about 5.5% by weight.

We have found that optimum amounts of the polyoxyethylene ethers found useful in our shortening compositions range from about 0.5 to about 1.0%. Typical such ethers include polyoxyethylene sorbitan monostearate containing 20 oxyethylene groups per mol, polyoxyethylene sorbitan distearate containing 5 oxyethylene groups per mol, polyoxyethylene sorbitan dimyristate containing 2 oxyethylene groups per mol, polyoxyethylene mannitan tristearate containing 10 oxyethylene groups per mol, polyoxyethylene sorbitan monostearate containing 2 oxyethylene groups per mol and mixtures of the aforestated materials. Principally because of its ready availability we prefer to use polyoxyethylene sorbitan monostearate containing 20 oxyethylene groups per mol.

As previously set forth, the glycerol monooleate and the long chain saturated free fatty acid materials may each be omitted from our shortening composition. However, we have found that the inclusion of both of these materials enhances the properties of our shortening composition.

We have also found that the optimum amount of glycerol monooleate in our shortening composition ranges from about 0.5 to about 1% by weight. The glycerol monooleate employed in our invention is conveniently prepared by the esterification of glycerol with oleic acid in the conventional manner. It is to be understood that the monoglyceride product will contain small amounts of diglycerides and triglycerides. For the purpose of this invention the material we designate as glycerol monooleate should contain at least 50% of the monoester.

We have found that the optimum amount of long-chain saturated free fatty acid containing from 12 to 22 carbon atoms for use in our shortening ranges from about 0.2 to about 1.0%. Suitable fatty acids include palmitic acid, stearic acid, myristic acid, behenic acid, lauric acid, etc. Principally, because of its low cost, we prefer to use stearic acid.

We have found that when our liquid shortening composition contains more than about 14% by weight of the emulsifier system the viscosity of the shortening is increased to undersirable levels. Additionally we have found that the shortening composition gives best baking results when it contains no more than about 14% by weight of the emulsifier system. In light of this, our preferred shortening composition should contain each of the above emulsifiers in the optimum amounts set forth, with the qualification that the total emulsifier system should not exceed 14% by weight of the liquid shortening. Our preferred shortening compositions have been found to have baking properties never before attained with liquid shortenings.

The liquid shortening of this invention is conveniently prepared by mixing together the liquid oil and the emulsifier system at temperatures sufficiently high to liquefy all of the ingredients. The liquid mixture is typically prepared at about 140 to about 150° F. with agitation and then cooled preferably to from 40 to 80° F. On cooling, a portion of the emulsifier system crystallizes from the solution while a portion remains dissolved in solution. Thus a portion of the emulsifier system is in suspension in the vegetable oil as solid crystalline material while a portion remains in solution in the vegetable oil. Naturally on standing over extended periods, such as in storage, the suspended portion of the emulsifier system does not remain uniformly dispersed throughout the oil and some separation occurs. However, simple agitation serves to redisperse the suspended material uniformly throughout the vegetable oil. This redispersion, however, is generally unnecessary due to the fact that uniform dispersion of the suspended material is not necessary in order to produce superior baked products with our liquid shortening.

We may include in our shortening minor amounts of other ingredients, such as coloring agents and antioxidants. When the shortening is to be stored for extended periods of time it is preferable to protect the shortening from deterioration in flavor and quality by the addition of an antioxidant. This is readily accomplished by the incorporation in the shortening composition of small amounts of antioxidants such as propyl gallate, butylated hydroxyanisole, butylated hydroxytoluene, nordihydroxyguaiaretic acid and mixtures comprising such compounds.

The following examples further illustrate our invention. It should be borne in mind that these examples are illustrative only and are not intended as a limitation of the invention.

EXAMPLE I

To prepare our liquid shortening, a mixture was formed by adding 18 parts of a glyceride ester reaction product of lactic acid, palmitic acid and glycerine sold under the trade name Atmul 200 by Atlas Chemical Industries and which contains in approximate amounts 23% glycerol monopalmitate, 20% glycerol dipalmitate, 16% glycerol monolactate monopalmitate, 13% glycerol monolactate dipalmitate, 7% glycerol dilactate monopalmitate with the balance being mono-, di- and tri-glycerides of lactic acid and palmitic acid; 3 parts of glycerol monooleate; 3 parts polyoxyethylene sorbitan monostearate having 20 oxyethylene groups per mol; 21 parts sorbitan monostearate; 0.338 parts of an antioxidant sold under the trade name of Tenox VI which is a mixture comprising butylated hydroxyanisole, butylated hydroxytoluene, propyl gallate and citric acid; 2 parts stearic acid; and 402.666 parts of refined soybean oil, all parts being by weight and the total equaling 450 parts. The mixture was then heated with agitation to 145° F. to liquefy all components. The liquefied material was then cooled in an ice bath to about 40° F. The period required for cooling was about 15 minutes during which time the mixture was continuously agitated. The cooled material was then removed from the ice bath and allowed to stand at room temperature for 24 hours. The product obtained was a flowable liquid shortening having a milky, light yellow color. The milky appearance was due to the presence of crystalline emulsifier material formed during the cooling period.

The baking properties of the liquid shortening were then tested by baking 13 ounce yellow layer cakes at 375–400° F. for 15 minutes using the following formula:

| | Grams |
|---|---|
| Cake flour | 400 |
| Granulated sugar | 520 |
| Nonfat dry milk solids | 40 |
| Baking Powder | 25 |
| Whole eggs | 220 |
| Salt | 15 |
| Concentrated vanilla extract | 5 |
| Water | 355 |
| Liquid shortening | 175 |

To show the superior baking properties of our liquid shortening in the preparation of yellow cake, cake was also baked using the same formula, baking temperature and baking time shown above, with the exception that 200 grams of Sweetex, a commercial plastic shortening manufactured by Proctor and Gamble Co., was substituted for our liquid shortening. 200 grams of the plastic shortening was used instead of 175 grams since the plastic shortening gives its best performance at this level in the above cake formula. The volume of the cake baked with the liquid shortening was greater than the volume of the cake baked with the plastic shortening. The texture, grain and general eating qualities of the cake baked with the liquid shortening were superior to the texture, grain and general eating qualities of the cake baked with the plastic shortening.

EXAMPLE II

The baking properties of the liquid shortening of Example I were tested by baking 13 ounce white layer cakes at 375–400° F. for 15 minutes using the following formula:

| | Grams |
|---|---|
| Cake flour | 400 |
| Granulated sugar | 480 |
| Nonfat dry milk solids | 40 |
| Baking powder | 25 |
| Egg whites | 240 |
| Salt | 15 |
| Concentrated vanilla extract | 5 |
| Water | 355 |
| Liquid shortening | 175 |

To show the superior baking properties of our liquid shortening in the preparation of white cake, cake was also baked using the same formula, baking temperature and baking time, with the exception that 200 grams of Sweetex plastic shortening was utilized instead of the liquid shortening. The cake prepared with our liquid shortening was superior in every respect to the cake prepared with the plastic shortening.

EXAMPLE III

TABLE 1

| Components | Percent of components in shortenings | | | | |
| --- | --- | --- | --- | --- | --- |
| | a | b | c | d | e |
| Soybean oil | 92.3 | 86.5 | 90.9 | 94.9 | 82.5 |
| Atmul 200 | 3.0 | 5.5 | 3.5 | 2.0 | 6.7 |
| Glycerol monooleate | 0.5 | 1.0 | .6 | .3 | 1.1 |
| Polyoxyethylene sorbitan monostearate (20) | 0.5 | 1.0 | .6 | .3 | 1.1 |
| Sorbitan monostearate | 3.5 | 5.0 | 4.0 | 2.3 | 7.8 |
| Stearic acid | 0.2 | 1.0 | .4 | .2 | .8 |

The baking properties of the shortening shown in Table 1 and of Sweetex brand plastic shortening were tested by preparing yellow cakes using the formula and baking procedure shown in Example I. As in Example I, 175 grams liquid shortening were utilized and 200 grams plastic shortening were utilized. The cakes obtained from the baking test were then rated by baking experts in the order of their general over-all quality. These ratings are presented in Table 2.

TABLE 2

| Cake: | Rating |
| --- | --- |
| c | 1 |
| a | 2 |
| b | 3 |
| d | 4 |
| e | 5 |
| Sweetex plastic shortening | 5 |

This test shows that the best baking results are obtained by using shortening containing our preferred amounts of emulsifiers. It further shows that cake prepared with amounts of our emulsifier system varying over a wide range are equal or superior to cake prepared with plastic shortening.

Since many embodiments of this invention may be made and since many changes may be made in the embodiments described, the foregoing is interpreted as illustrative and our invention is defined by the claims defined hereafter.

We claim:

1. A normally liquid shortening composition suitable for production of baked goods comprising in combination a normally liquid, edible vegetable oil and not more than 14% by weight of an emulsifier system which comprises from about 2.0 to about 7.0 by weight of a glyceride ester reaction product obtained by reacting under esterification conditions a mixture of glycerine, lactic acid and at least one saturated fatty acid containing 12 to 22 carbon atoms inclusive, the ratio of lactic acid to glycerine and of fatty acid to glycerine both being in the range of 0.8:1 to 1.5:1 in the said mixture, from about 2.0 to about 8.0% by weight of at least one solid fatty acid partial ester of a hexitan, from 0.2 to about 2% by weight of at least one solid fatty acid ester of a hexitan polyoxyethylene ether having from 2 to 20 oxyethylene groups inclusive per mol, from 0 to about 1.5% by weight of at least one free saturated fatty acid containing from 12 to 22 carbon atoms inclusive and 0 to about 2% of glycerol monooleate, the said weights being based on the weight of the shortening composition.

2. A normally liquid shortening composition suitable for the production of baked goods comprising in combination a normally liquid, edible vegetable oil and not more than 14% by weight of an emulsifier system which comprises from about 3.0 to about 6.0% by weight of a glyceride ester reaction product obtained by reacting under esterification conditions a mixture of glycerine, lactic acid and at least one saturated fatty acid containing 12 to 22 carbon atoms inclusive, the ratio of lactic acid to glycerine and of fatty acid to glycerine both being in the range of 0.8:1 to 1.5:1 in the said mixture, from about 3.5 to about 5.5% by weight of at least one of a solid fatty acid partial ester of a hexitan, from 0.5 to about 1.0% by weight of at least one solid fatty acid ester of a hexitan polyoxyethylene ether having from 2 to 20 oxyethylene groups inclusive per mol, from about 0.2 to about 1.0% by weight of at least one of a free saturated fatty acid containing from 12 to 22 carbon atoms inclusive and from about 0.5 to about 1.0% of glycerol monooleate, the said weights based on the weight of the shortening composition.

3. The composition of claim 2 wherein the vegetable oil is soybean oil.

4. The composition of claim 2 wherein the glyceride ester reaction product is obtained from a mixture of glycerine, lactic acid and saturated fatty acid selected from the group consisting of palmitic acid, stearic acid and mixtures of said acids.

5. The composition of claim 2 wherein the solid fatty acid partial ester of hexitan is sorbitan monostearate.

6. The composition of claim 2 wherein the solid fatty acid ester of a hexitan polyoxyethylene ether is polyoxyethylene sorbitan monostearate containing 20 oxyethylene groups per mol.

7. A cake mix comprising flour, baking powder and sugar blended with a normally liquid shortening composition comprising in combination a normally liquid, edible vegetable oil and not more than 14% by weight an emulsifier system which comprises from about 3.0 to about 6.0% by weight of a glyceride ester reaction product obtained by reacting under esterification conditions a mixture of glycerine, lactic acid and at least one saturated fatty acid containing 12 to 22 carbon atoms inclusive, the ratio of lactic acid to glycerine and of fatty acid to glycerine both being in the range of 0.8:1 to 1.5:1 in the said mixture, from about 3.5 to about 5.5% by weight of at least one solid fatty acid partial ester of a hexitan, from 0.5 to about 1.0% by weight of at least one solid fatty acid ester of a hexitan polyoxyethylene ether having from 2 to 20 oxyethylene groups inclusive per mol, from about 0.2 to about 1.0% by weight of at least one free saturated fatty acid containing from 12 to 22 carbon atoms inclusive and from about 0.5 to about 1.0% of glycerol monooleate, the said weights being based on the weight of the shortening composition.

References Cited

UNITED STATES PATENTS

| 2,746,868 | 5/1956 | Gross et al. | 99—123 |
| 2,868,652 | 1/1959 | Brock | 99—118 |
| 3,071,472 | 1/1963 | Hager et al. | 99—94 |
| 3,117,010 | 1/1964 | Geisler | 99—118 |
| 3,145,107 | 8/1964 | Howard | 99—118 |

MAURICE W. GREENSTEIN, *Primary Examiner.*